July 5, 1927.
J. E. BOEGEN
1,634,608
LIQUID MEASURING ATTACHMENT FOR TANKS
Filed April 6, 1925
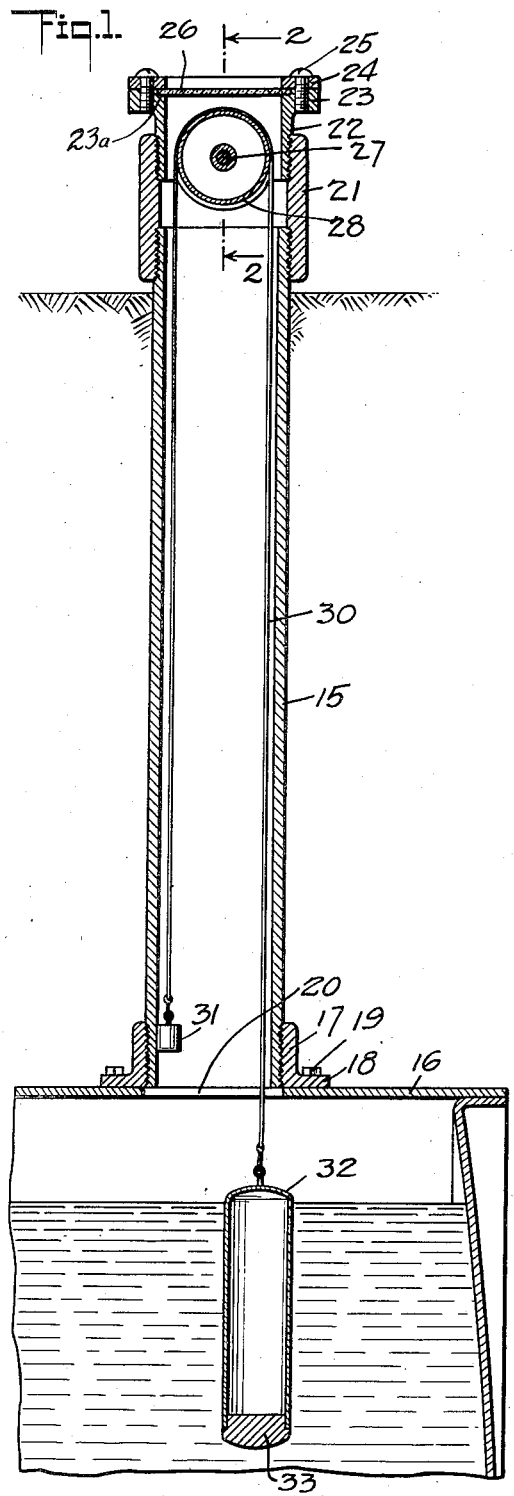
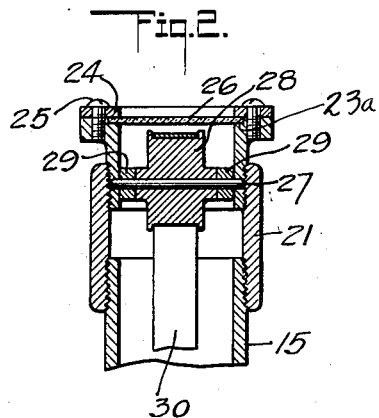
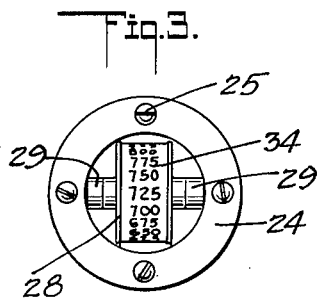
INVENTOR.
JOHN E. BOEGEN
BY *Munn & Co.*
ATTORNEYS.

Patented July 5, 1927.

1,634,608

UNITED STATES PATENT OFFICE.

JOHN E. BOEGEN, OF LOS ANGELES, CALIFORNIA, ASSIGNOR TO BOEGEN GAUGE COMPANY, INC., OF LOS ANGELES, CALIFORNIA, A CORPORATION OF NEVADA.

LIQUID-MEASURING ATTACHMENT FOR TANKS.

Application filed April 6, 1925. Serial No. 21,032.

My invention relates to and has for its purpose the provision of an extremely simple, inexpensive and durable attachment for gasoline storage tanks and similar subterranean tanks by which the amount of liquid in a tank can be determined from a point above the ground and without the necessity of lowering measuring rods or similar devices into the tank as is now the present practice.

It is also a purpose of my invention to provide a liquid measuring device which is adaptable to storage tanks of conventional construction and without in any way modifying the construction of such tanks.

I will describe only one form of liquid measuring attachment for tanks embodying my invention, and will then point out the novel features thereof in claims.

In the accompanying drawings:

Figure 1 is a view showing in vertical section one form of measuring attachment embodying my invention in applied position to a conventional storage tank.

Figure 2 is a vertical sectional view taken on the line 2—2 of Figure 1.

Figure 3 is a plan view of the attachment shown in the preceding views.

Referring specifically to the drawings, in which similar reference characters refer to similar parts in each of the views, my invention in its present embodiment comprises a pipe 15 of suitable length and diameter so as to extend upwardly from a subterranean tank 16 to the surface of the ground, such pipe being rigidly connected to the tank through the medium of an attaching collar 17 provided with a flange 18 through which bolts 19 extend for rigidly securing the collar to the tank and into surrounding relation to an opening 20. The lower end of the pipe 15 is threadedly connected to the collar 17, while the upper end of the pipe which projects above the ground is threaded exteriorly to receive a connecting sleeve 21, the latter in turn being interiorly threaded to receive a cap comprising an annular body 22 having a flange 23 to which is secured a ring 24 by means of screws 25 for securing a transparent disc 26 in closing relation to the top of the cap. It is to be noted that the flange 23 is formed with an annularly depressed portion 23ª so that when the ring 21 is secured in place an annular groove is provided in which the disk 26 is snugly received.

The body 22 is formed with openings in which the opposite ends of an axle 27 are mounted, a flanged pulley 28 being rotatable upon the axle 27 and being maintained centrally of the axle by means of spacing washers 29. A flexible metal tape 30 is trained around the pulley 28, the flanges of the pulley preventing accidental displacement of the tape from the pulley, and the two stretches of tape depending from the pulley and extending downwardly through the pipe 15, with the end of one stretch provided with a weight 31 which counterbalances a float 32 secured to the lower end of the other stretch of the tape. This float 32 is of elongated form as is clearly shown in Figure 1 and is provided at its lower end with a weight 33 by which the float is maintained at all times in upright position.

As illustrated in Figure 3, one surface of the tape 30 is calibrated as indicated at 34 for the purpose of indicating the number of gallons of liquid contained in the tank 16, and which calibrations are readily viewed through the transparent plate 26.

In practice, the measuring attachment is capable of being applied to the pipe 15 after the tank has been placed in the ground, the tape, weights and float being lowered through the pipe so that the float is partly submerged in the liquid and maintained in upright position by means of the weight 33. As the vertical position of the float varies in accordance with the level of the liquid contained in the tank, it will be clear that the tape 30 is moved with and by the float so that that calibration disposed uppermost on the pulley 28 will accurately indicate the number of gallons of liquid contained in the tank.

As the entire measuring device is supported on the cap previously described it will be manifest that the entire device can be removed from the pipe 15 and through the latter, the weight 33 operating to maintain the float 32 in a position within the tank directly beneath the pipe 15 so that the proper operation of the device is at all times insured as well as permitting the removal of the float from the tank when it is desired to remove the device for any purpose such as the introduction of liquid into the tank through the pipe, should it be impossible for any reason to use the ordinary filling pipe (not shown) to discharge liquid into the tank.

Although I have herein shown and described only one form of liquid measuring attachment for tanks embodying my invention, it is to be understood that various changes and modifications may be made therein without departing from the spirit of the invention and the spirit and scope of the appended claims.

What I claim is:

1. In combination, a tank for liquids, a pipe extending upwardly from the tank, a connecting sleeve on the upper end of the pipe, a cap supported on the sleeve and having a transparent closure member, a pulley rotatably mounted in the cap, a calibrated tape trained about the pulley and extending downwardly into the pipe, a weight on one end of the tape, and a weighted float on the opposite end of the tape.

2. A liquid measuring device of the character described comprising a pipe, a sleeve threaded on the upper end of the pipe, a cap threaded on the sleeve and provided at its upper end with a flange formed with an annular depression, a pulley rotatably mounted in the cap, a calibrated tape trained about the pulley and extending downwardly into the pipe, a weight on one end of the tape, a weighted float on the opposite end of the tape, a ring secured to the flange, and a transparent disk fitted in said depression and closing said cap and confined therein by said ring.

JOHN E. BOEGEN.